United States Patent

[11] 3,597,990

[72] Inventor Joseph P. McCartin
 43-39 158th St., Flushing, N.Y. 11358
[21] Appl. No. 33,561
[22] Filed May 1, 1970
[45] Patented Aug. 10, 1971

[54] ZERO-LASH RIGHT-ANGLE MOVEMENT
 9 Claims, 3 Drawing Figs.
[52] U.S. Cl................................................ 74/415,
 74/425, 74/458, 74/464, 74/409 (Discl)
[51] Int. Cl..................................................... F16h 1/04,
 F16h 1/16, F16h 55/10
[50] Field of Search........................................ 74/409,
 415, 416, 424.5, 425, 426, 458, 464, 465

[56] References Cited
UNITED STATES PATENTS
| | | | |
|---|---|---|---|
| 767,588 | 8/1904 | Moakler...................... | 74/464 |
| 1,791,116 | 2/1931 | Brown et al................. | 74/458 |
| 2,714,315 | 8/1955 | Reader et al................ | 74/465 |
| 3,199,363 | 8/1965 | Pickles....................... | 74/425 |
| 3,495,470 | 2/1970 | McCartin .................. | 74/425 |

Primary Examiner—Arthur T McKeon
Attorney—Allison C. Collard

ABSTRACT: A right angle mechanical power transfer apparatus for transmitting a force from its input to its output consisting of an input rotary member having a contoured thread which is in engagement with an output rotary member having a plurality of offset rotatable members which engage opposite sides of the thread in order to eliminate side motion play or backlash.

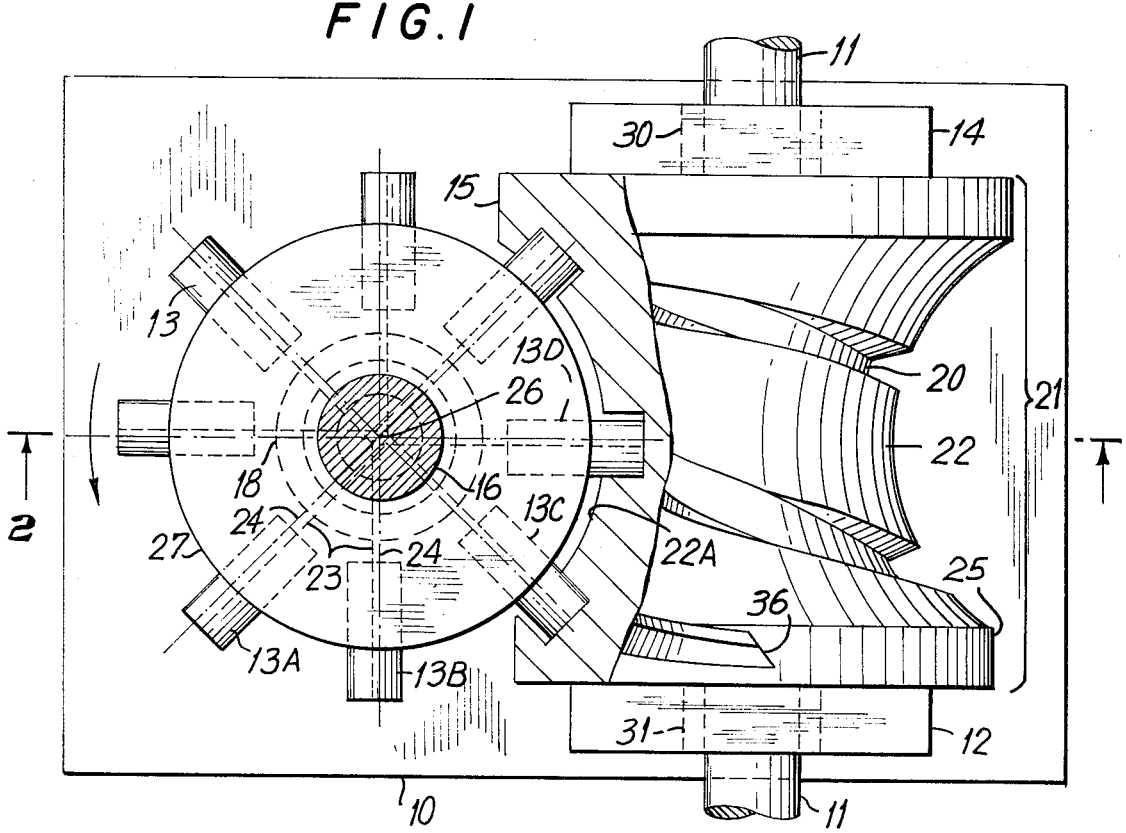
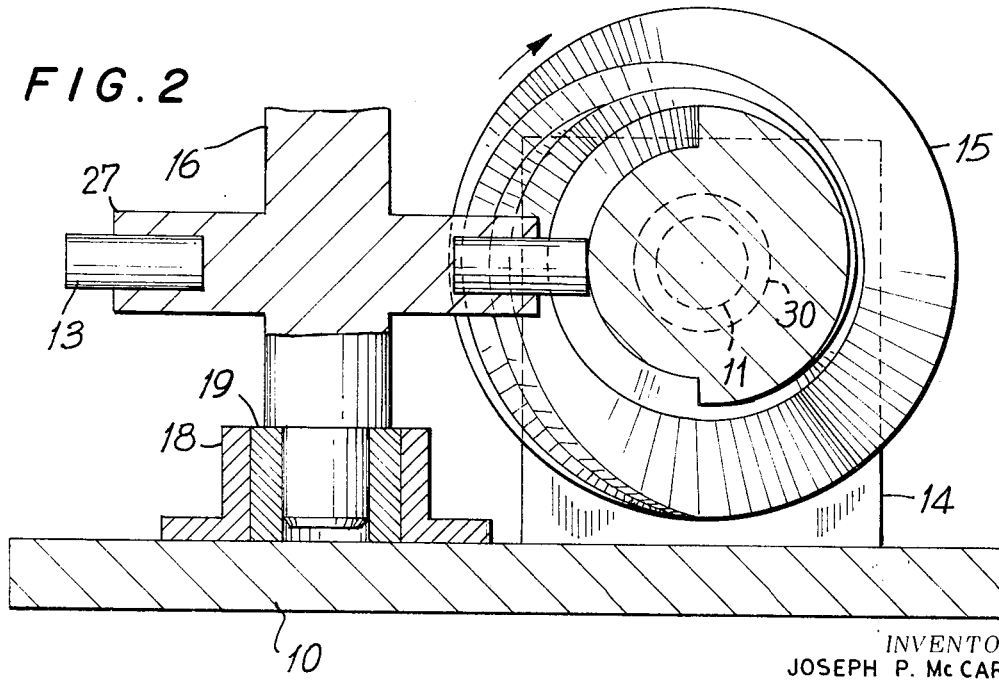
INVENTOR.
JOSEPH P. McCARTIN (3,597,990)

ZERO-LASH RIGHT-ANGLE MOVEMENT

This invention relates to a compact and continuous motion right-angle movement for use in precision machine tools.

More specifically, this invention relates to a right-angle thread drive for transmitting a force from its input to its output member so as to eliminate side motion, play and backlash.

Conventional gear reduction drives used in machinery often produce excessive heat because of the mechanical wear and friction of engaging elements. Moreover, the accuracy of conventional gear reduction drives deteriorates during use as a result of mechanical wear due to their required operating clearance, and thus causes undesirable increasing backlash between the drive components. Right angle movements which are utilized in applications requiring large power transfers are particularly subject to excessive wear of the engaging elements.

Accordingly, the present invention provides an improved right-angle movement which utilizes a contoured thread on its rotary member in order to permit the multiple engagement of a plurality of thread followers to the threads of the rotary member so that loads requiring high torque may be driven without backlash from either direction of rotation. The rotary member which consists of a thread wheel having a circularly concave profile within an external radius corresponding to the radius of the thread follower wheel so that a large number of thread followers may be in continuous engagement with the thread wheel. The axes of the thread followers are set slightly off centered from the axis of the thread follower wheel or driven member so that the thread followers will engage opposite sides of the thread groove allowing desired operating clearance without backlash, side motion, or any play. This represents an improvement over the right-angle movements shown in U.S. Pat. Nos. 3,495,470 and 3,477,305.

It is therefor an object according to the present invention to provide a compact right-angle movement which produces speed reduction with negligible friction and no backlash.

It is another object according to the present invention to provide a zero-lash right-angle movement having a plurality of thread followers engaged to a rotary member which are offset on their axes with respect to the axis of the thread follower wheel.

It is still a further object according to the present invention to provide a zero-lash right-angle movement which is simple in design, reliable in operation, and overcomes many of the disadvantages of conventional gear reduction drives.

Other objects and features of the present invention will become apparent from the following detailed description considered in connection with the accompanying drawings which disclose the embodiments of the invention. It should be understood, however, that the drawings are designed for the purpose of illustration only and not as a definition of the limits of the invention.

In the drawings, wherein similar reference characters denote similar elements throughout the several views:

FIG. 1 is a top plan view of the improved right-angle movement according to the invention;

FIG. 2 is a cross-sectional view taken along section 2-2 of FIG. 1; and

Figure 3:
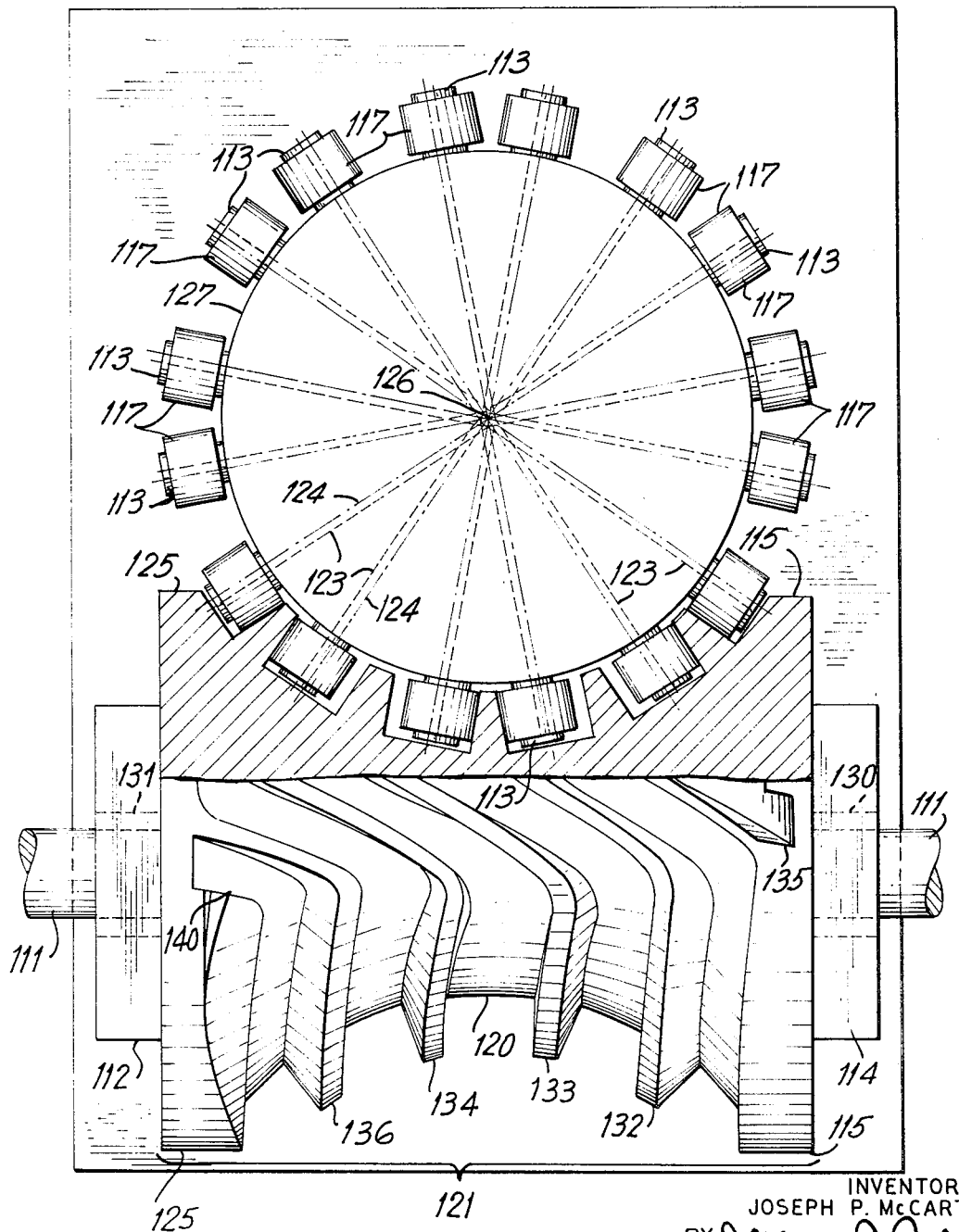
FIG. 3 is another top plan view of a further embodiment of the invention.

Referring to FIGS. 1 and 2, there is shown mounted on a stand 10, an input rotary member consisting of a thread wheel 21 mounted on a drive shaft 11. Shaft 11 is trunnioned through bearings 30 and 31 in parallel spaced-apart journal blocks 12 and 14. Thread wheel 21 includes end flanges 15 and 25 integrally formed therewith for supporting therebetween hub 20 having a circular concave profile. On the surface of hub 20 is a spiral thread 22 integrally formed on the body of hub 20 between end flanges 15 and 25.

A thread follower 27 is pivotably mounted at right angles to thread wheel 21 on output shaft 16 and includes a plurality of radially spaced-apart cam followers 13 projecting from its periphery and in engagement with the contoured slots which are formed between adjacent segments of thread 22. Shaft 16 is pivotably mounted in thrust bearing 19 which is contained within flange 18 secured to the surface of base 10. Shaft 16 pivots around vertical axis 26.

Thread followers 13 may be pivotably retained within thread wheel 27 by means of bushings or roller bearings (not shown) so that they may rotate freely when in contact with the sides of the contoured slots of the thread. The concave profile of thread wheel 21 permits the maximum engagement of followers 13 in the contoured slots, between adjacent segments of threads 22. The hub surface 20 of each slot is prescribed in a circular profile with the locus of its center identical to that of axis 26 of thread follower 27. In a similar manner, the profile of the peripheral surfaces of thread segments 22 also form a circular cross section having its center on axis 26 of thread follower 27. Moreover, thread followers 13 are directed in perpendicular engagement with the surfaces of hub 20 so that a plane passing through all of the axes 23 of followers 13 will also include the axes of rotation of thread wheel 21.

The axes 23 of followers 13 do not converge on axis 26 of thread follower 27 but are slightly offset a small parallel displacement from the radial axes 24 which converge on axis 26. Thus, each pair of adjacent thread followers 13 are shifted toward each other so that they will engage opposite sides of the thread groove. For example, followers 13A and 13B which are shown on the bottom portion of FIG. 1 have their axes shifted slightly together and parallel to the true axes 24 which converge on follower axis 26. The amount of offset is determined by the diameter of followers 13 and the spacing or gap between threads 22. Thus, adjacent followers 13C and 13D engage the opposite walls of thread segment 22A without leaving any clearance, so that there is no backlash exhibited by follower wheel 27 during the movement of thread wheel 21. Moreover, since adjacent thread followers engage opposite walls of the thread, the followers will rotate in different directions on their shifted axes 23 to provide a frictionless engagement of the thread wheel.

In the embodiments shown, thread followers 13 are spaced at 45° intervals so that each complete rotation of wheel 21 will advance thread followers 27 one-eighth of a revolution.

Referring to FIG. 3, there is shown a further embodiment of the present invention wherein thread followers 113 include frictionless bearings 117 pivotably mounted thereon for contact with corresponding thread surfaces. In this particular embodiment, there is shown 16 thread followers mounted on follower wheel 127. Each adjacent pair of followers 113 have their axes 123 shifted together away from axes 124 which pass through the center 126 of thread wheel 127. Thus, the followers shown rotate on 16 different centers equally spaced away from the follower wheel center 126.

In this particular embodiment, thread followers 113 are engaged to an indexing drive wheel 121 similar to that shown in U.S. Pat. No. 3,477,305. Indexing wheel 121 is mounted on a drive shaft 111. Shaft 111 is trunnioned through bearings 130 and 131 in parallel, spaced-apart journal blocks 112 and 114. Thread wheel 121 includes end flanges 115 and 125 integrally formed therewith for supporting therebetween hub 120, having a circular concave profile. On the surface of hub 120 is a continuous-indexing thread having segments 132, 133, 134 and 136 which are integrally formed on the body of hub 120 between end flanges 115 and 125. For each rotation of indexing wheel 121, thread followers 113 will be indexed to the next adjacent groove by means of the transition zones between adjacent threads 132, 133, 134 and 136. The offset of axes 123 of each pair of adjacent thread followers 113 causes the thread followers to engage the opposite walls of thread segments 132—134 and 136 allowing desired rolling clearance while eliminating any backlash by follower wheel 127 during the movement of thread wheel 121. In addition, bearings 117 which are pivotably arranged on each of the followers 113 will provide a frictionless movement as they contact the opposite faces of the thread segments rotating in different directions. Followers 113 and their bearing movements 117 will engage and disengage indexing wheel 121 through exit and entrance slots 135 and 140, regardless of the direction of rotation of thread wheel 121.

The above-described embodiments represent a substantial improvement in the right-angle movements shown in my above-described patents, by providing a plurality of different centers of rotation for the thread followers due to the offset axis, so that unwanted clearance is eliminated, and backlash of movement between the follower wheel and the thread wheel is avoided, reducing the effect of path error to an absolute minimum.

In both of the above-described embodiments, the axis of the rotary input member is perpendicular to the axis of rotation of the follower wheel. Moreover, the locus of the axis of the circular concave surface of the input member is coaxial with the axis of the output member.

While only a few embodiments of the invention have been shown and described, it will be understood however that many changes and modifications may be made thereunto without departing from the spirit and scope of the invention.

What I claim is:

1. A right-angle movement apparatus from transmitting a predetermined ratio of force from its output with respect to its input comprising, a rotary input member having a circular concave surface, a circularly concave thread formed integrally into said surface defining a groove, an output rotary member, and a plurality of thread followers retained in radially spaced-apart relationship on the periphery of said rotary output member, the axes of adjacent pairs of thread followers being shifted toward each other for engagement to the opposite sides of said thread.

2. The right-angle movement apparatus as recited in claim 1 wherein said rotary input member comprises a concave spiral thread.

3. The right-angle movement apparatus as recited in claim 1 wherein said rotary input member comprises an indexing device having a spiral thread including an indexing transition.

4. The right-angle movement apparatus as recited in claim 1 wherein the axis of said input member is perpendicular to the axis of rotation of said output member.

5. The right-angle movement apparatus as recited in claim 1 wherein the locus of the axis of the circular concave surface of said input member is coaxial with the axis of said output member.

6. The right-angle movement apparatus as recited in claim 1 wherein said thread followers additionally comprise frictionless bearings for engagement with the thread surface.

7. The right-angle movement apparatus as recited in claim 1 wherein the axes of said thread followers are disposed along the same plane as the axis of said input member.

8. The right-angle movement apparatus as recited in claim 1 wherein the offset axes of said thread followers intersect around the axis of rotation of said output member.

9. The right-angle movement apparatus as recited in claim 8 wherein each of said offset axes of said followers is parallel to the corresponding radial axes converging on the axis of rotation of said output member.